United States Patent
Silver

[15] 3,659,036
[45] Apr. 25, 1972

[54] ELECTRICAL JUNCTION BOX

[72] Inventor: Harry Silver, 1844 Meadowbrook Road, Abington, Pa. 19001

[22] Filed: Jan. 20, 1971

[21] Appl. No.: 107,927

[52] U.S. Cl. ............................ 174/58, 270/3.3, 248/302
[51] Int. Cl. ................................................ H02g 3/10
[58] Field of Search ............ 174/58, 53; 220/3.2, 3.3, 3.4, 220/3.5, 3.6, 3.9; 248/DIG. 6, 302; 339/122

[56] References Cited

UNITED STATES PATENTS

| 3,187,084 | 1/1965 | Stillman et al. | 174/58 |
| 2,340,823 | 2/1944 | Scott | 220/3.6 |

FOREIGN PATENTS OR APPLICATIONS

| 785,896 | 11/1957 | Great Britain | 220/3.3 |

Primary Examiner—Lewis H. Myers
Assistant Examiner—D. A. Tone
Attorney—Caesar, Rivise, Bernstein & Cohen

[57] ABSTRACT

An electrical junction box comprising a back wall and side, top and bottom walls defining a cavity for reception of an electrical component such as a receptacle or switch. Spring clips are pivotally mounted within recesses in the back wall of the box for the purpose of mounting the box on a supporting surface such as a wall or pole. A plurality of the clips is provided, and each of the clips is pivotable from a position wherein it is wholly confined within the perimeter of the back wall to a position where it extends outwardly of the outer lateral edge of the back wall. Each clip includes an opening formed therein through which a screw, nail or other fastening device can be used for mounting the box.

9 Claims, 7 Drawing Figures

PATENTED APR 25 1972
3,659,036
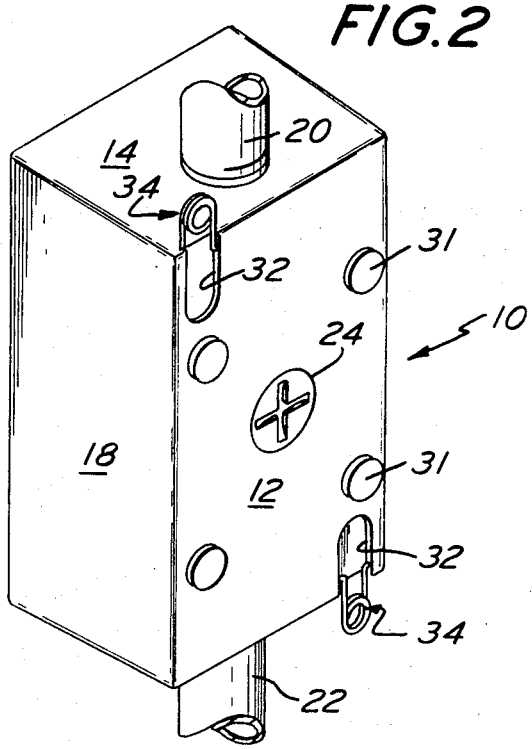
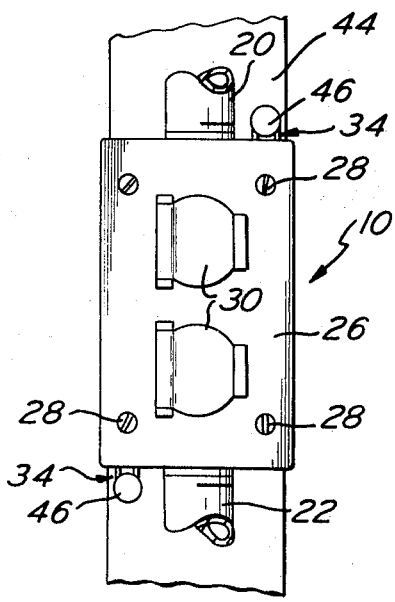
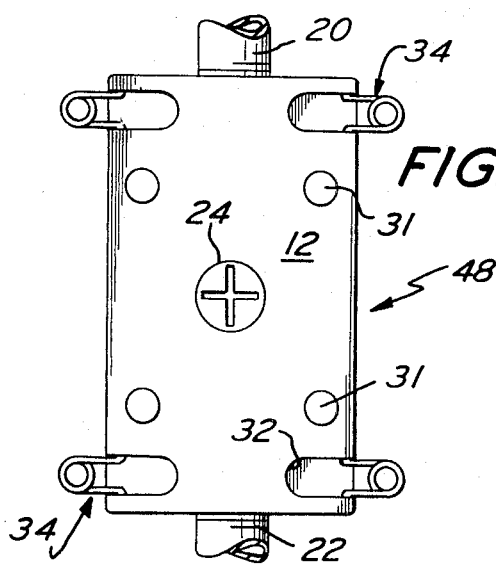
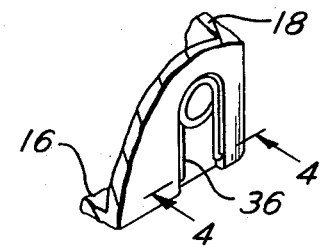
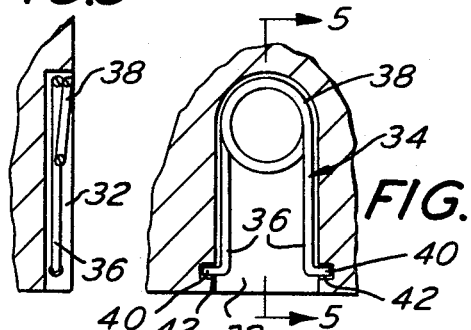
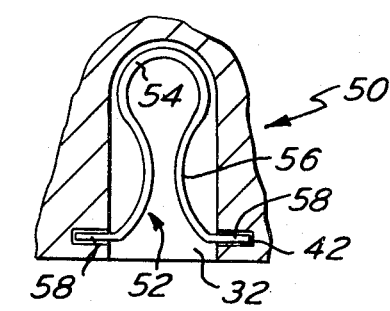
INVENTOR
HARRY SILVER
BY
Caesar, Rivise,
Bernstein & Cohen
ATTORNEYS

ELECTRICAL JUNCTION BOX

This invention relates to an electrical junction box, and more particularly, to an electrical junction box that is weatherproof and adapted for use outdoors.

Electrical junction boxes that are weatherproof are now in common usage for outdoor installations. Generally, these boxes are die cast from aluminum, and include a back wall, a top wall, a bottom wall and a pair of side walls. All of these walls are unitary with each other, and define an open cavity for reception of an electrical fixture or component such as a receptacle, a switch or a socket for an outdoor bulb. A gasketed cover plate is placed over the cavity to insulate the electrical component and maintain the weatherproof quality of the electrical junctions within the box. The wires coming into or leaving the box enter through conduits which are threadedly secured in threaded bosses formed in the walls of the box.

One of the problems that has arisen in connection with the use of the outdoor electrical junction boxes is the securement of the boxes in place. In this connection, great care must be taken in this securement in order to avoid the impairment of the waterproof quality of the box. Methods that have been used for securing the box in place have been the use of brackets for securing the box or the use of clips that were placed over the conduits containing the wires going to and from the box.

A recent improvement on the electrical junction boxes has been the provision of lugs that are threadedly secured on the back wall of the junction box. Each of these lugs has a pair of aligned holes formed therein. A screw passes through one of each pair of holes and secures the lug to the back wall of the junction box. The other hole in each lug is positioned outwardly of the outer edge of the bottom wall. The junction box is secured on a supporting surface by passing a screw, nail or other fastening device through the outwardly-positioned hole in the lug. A plurality of these lugs is provided for securement at various positions around the junction box. Additionally, the lugs are dimensioned in such a way as to have them totally within the perimeter of the back wall of the box any time they are not in use.

Although the use of the lugs on the junction boxes provides a distinct improvement over the prior art junction boxes, they still suffer a number of disadvantages. One of the disadvantages occurs during the manufacturing process of the box in that a separate threaded hole must be tapped for each of the lugs, and each of the lugs must be secured in place by a screw during the manufacturing process. Another disadvantage of the use of the lugs is that the lugs are rigidly held in place on the box by their screws. Accordingly, they project outwardly from the box only in a single plane, which plane is the same plane as the back wall of the junction box. Although this configuration is acceptable for use on any planar surface, it is not readily adaptable for use on non-planar or irregular surfaces, such as a pole or other non-planar surface.

The junction box of this invention includes securing clips which overcome all of the disadvantages of the prior screw-fastened lugs. The clips are inserted in place by merely snapping them into aligned holes, and no screw fastening is necessary during the assembly process. Additionally, the clips are pivotally mounted on the back wall of the junction box, and can be used on both planar and non-planar surfaces.

It is accordingly an object of this invention to provide a novel electrical junction box.

It is another object of this invention to provide a novel electrical junction box having pivotable clips for securement of the junction box on a supporting surface.

These and other objects of this invention are accomplished by providing an electrical junction box comprising a back wall, a top wall, a bottom wall and side walls defining an open cavity for reception of an electrical component, a plurality of recesses formed in said back wall, and a clip pivotally mounted in each of said recesses for securement of said junction box on a supporting surface, each of said clips having an opening formed therein for reception of a fastening device.

Other objects and many of the attendant advantages of this invention will be readily appreciated as the same becomes better understood by reference to the following detailed description when considered in connection with the accompanying drawings wherein:

FIG. 1 is a front elevational view of the electrical junction box of this invention as mounted on a pole;

FIG. 2 is a rear perspective view of the electrical junction box of this invention;

FIG. 3 is an enlarged partial rear perspective view of the electrical junction box of FIG. 2, and showing the details of one clip used in the box;

FIG. 4 is an enlarged sectional view taken along the line 4—4 of FIG. 3;

FIG. 5 is a sectional view taken along the line 5—5 of FIG. 4;

FIG. 6 is a rear elevational view showing a first modification of the electrical junction box of this invention; and FIG. 7 is an enlarged partial sectional view showing the clip used in a second modification of the electrical junction box of this invention.

Referring now in greater detail to the various figures of the drawings wherein like reference characters refer to like parts, an electrical junction box embodying the present invention is generally shown at 10 in FIGS. 1 and 2. Device 10 comprises a back wall 12, a top wall 14, a bottom wall 16 (FIG. 3) and side walls 18.

The junction box is formed from a die casting process, and comprises a lightweight, water-resistant material such as aluminum or an aluminum alloy. The walls are unitary with each other and define an open cavity for the insertion of electrical fixtures or components. All of the usual interior fixtures of the electrical junction boxes now in use are provided within the interior of box 10. The specific components form no part of this invention, as any or all of those of the prior art are adapted for use in the junction box of this invention. Generally, the junction boxes include longitudinally aligned internally threaded bosses in the top and bottom walls. In the embodiment of the invention shown, a conduit 20 is threadedly secured in the upper boss and a conduit 22 is threadedly secured in the lower boss. These conduits are used for bringing conductors, such as wires, into and out of the box 10. Internally threaded bosses can also be provided in any or all of the other walls of the box. Again, in the embodiment shown, an internally threaded boss is provided in the rear wall 12. Since this boss is not in use in the embodiment shown, it is covered by a threaded plug 24 (FIG. 2). The threaded conduits 20 and 22 and plug 24 maintain the watertight and weatherproof quality of the junction box 10.

The junction box also includes the usual spaced pillars which project horizontally outward from the rear wall 12. Each of these pillars is internally threaded. A cover plate 26 is secured in place by screws 28 which pass through the cover plate and are received in the threaded pillars. The cover plate seals the cavity of the junction box 10. A gasket is normally provided between the cover plate and the walls of the junction box in order to maintain the waterproof quality of the junction box. Although the junction box can be used for various electrical components, in the embodiment shown, a duplex receptacle is contained within the junction box. A pair of waterproof covers 30 is placed over the receptacle.

The exterior surface of the back wall 12 of box 10 includes four spaced studs 31 formed thereon. The purpose of the studs is to space the receptacle from the supporting surface in order to let water, snow or other materials pass behind the box when it is mounted in place. A pair of substantially U-shaped recesses 32 is formed in the exterior surface of the back wall 12. A clip 34 is pivotally mounted in each recess 32. As best seen in FIGS. 4 and 5, each clip includes a pair of substantially parallel legs 36 and a ring 38 joining the two legs. The clip 34 comprises a resilient material, such as spring steel, and is formed from an elongated rod of the resilient material. The ring 38 is formed by wrapping the rod around a circular mandrel until the complete circle is formed.

As seen in FIG. 4, each leg 36 has a flange 40 integrally formed at the end thereof. Each flange 40 is received in a hole 42 formed in the wall of recess 32 adjacent the edge of back wall 12. Since the clip 34 is formed from a resilient material, the two legs 36 can be squeezed toward each other in order to permit the insertion of the flanges 40 into holes 42. Thus, when the pressure on the legs 36 is released, the flanges 40 will be snapped in place.

As seen in FIG. 4, the wall of recess 32 is basically U-shaped, and follows the contour of the clip 34. As seen in FIG. 5, the depth of the recess 32 is such as to permit the entire clip 34 to lie in the recess within the plane of the exterior surface of back wall 12.

When an electrician is using the box 10 of this invention, the front plate 26 will not be secured in place, and the hollow cavity of the box will be exposed. The conduits 20 and 22 are threadedly secured in place on the box and the box is placed adjacent the supporting surface, which in the embodiment shown, constitutes a pole 44 having a flat exposed face. The wires are then fed through the conduits and the electrical fixture is then secured within the cavity of the box 10 and the necessary wiring to the fixture is completed.

Once the fixture has been inserted, the face plate 26 is then secured in place by screws 28. Thereafter, the clips 34 are pivoted from the position shown in FIGS. 3 to 5 to the position shown in FIG. 2. The box is then held against the supporting pole 44 and is secured in place by passing nails 46 through the rings 38 of each of the clips 34. Other securing means known to the art can also be used, such as screws or rivets.

As seen in FIG. 1, the clips 34 are offset relative to the center of box 10. The purpose of having the offset is to insure that the conduits 20 and 22 will not interfere with the clips when the clips are secured in place. The use of the two clips shown in FIG. 1 is sufficient to securely fasten the box 10 to the supporting pole 44.

A modified embodiment of the electrical junction box of this invention is generally shown at 48 in FIG. 6. Device 48 is substantially identical to device 10 in that it includes the back wall 12, the top wall 14, the bottom wall 16, and the side walls 18. Additionally, the interior structure is the same and studs 31 are provided on the exterior surface of the back wall. Device 48 differs from device 10 in the provision of four clips 34 which are laterally extending from the back wall 12 as opposed to the vertically extending clips in device 10. Clips 34 are received in U-shaped recesses 32 which extend laterally inward from the side edges of back wall 12.

Device 48 is used in the same manner as device 10. It is particularly adapted for use on non-planar surfaces, such as cylindrical poles. Thus, the clips 34 can be pivoted to a point where they will abut the circumference of the poles in use. In the prior art screw-fastened lugs, it was not possible to conveniently secure the lugs to the poles since the lugs extended outwardly in the same plane as the rear wall of the box, and were thus spaced a substantial distance from the pole.

When using the device 48, not all of the clips 34 need be used. Those which are not used are maintained within recesses 32, in the manner shown in FIG. 5. These clips will not interfere with the securement of the box 48 on the supporting surface, since, as shown in FIG. 5, the outer surface of the clips is interior of the plane of the outer surface of back wall 12. Accordingly, only those clips 34 that are necessary for the securement of the box 48 in place will be pivoted outwardly to the position shown in FIG. 6.

A portion of a third embodiment of the electrical junction box of this invention is generally shown at 50 in FIG. 7. Device 50 is substantially identical to devices 10 and 48, with the exception of the fact that the clips 34 are replaced by clips 52. Clips 52 are also formed from a resilient material, such as spring steel, and include a substantially circular portion 54 which terminates in a reduced neck 56. A pair of flanges 58 is received in holes 42, in the same manner as flanges 40.

Electrical box 50 is used in the same manner as the electrical boxes previously described. The one difference in use will occur when there is a fixed shaft, such as a screw or nail, on a supporting surface and it is desired to hang the box 50 from the shaft. This is accomplished by exposing the upper clip 52 and snapping the clip over the shaft by passing the shaft through the reduced neck portion 56. The head of the screw or nail will be larger in diameter than the diameter of the circular portion 54, thereby securing the box in place. Thereafter, the bottom of the box can be secured in place by passing a nail, screw or other fastening device through the lower clip 52.

The foregoing description has been directed to the securement of a single electrical junction box to a surface. Frequently, it is desired to have a plurality of junction boxes electrically interconnected and mounted on the same surface in close proximity to one another. This is accomplished by interconnecting the boxes, either one above the other, or one beside the other, through the use of bushings or nipples threadedly secured in adjacent bosses of the adjacent boxes. The two boxes can be secured together by passing a nut and bolt through aligned holes in a pair of spring clips 34 from the adjacent boxes. Thus, the circular portions 38 of the spring clips of one box will be overlapped with the adjacent circular portions of the spring clips of the other box and secured together through a nut and bolt. Alternatively, a single nail can pass through two overlapped clips, thereby securing the two boxes together on the supporting surface. The other clips on the boxes can be used in the manner described above.

The junction boxes of this invention can be formed by any of the methods known to the art for forming the prior art junction boxes. Die casting is a preferred method. The materials used are also a matter of choice, and can be aluminum, an aluminum alloy, brass or steel. The clips 34 are formed from spring metal. Spring stainless steel is preferred. The holes 42 for the reception of the flanges on the spring clips are drilled after the box has been cast.

Although the boxes of this invention have been shown as being rectangular in shape, it should be understood that the clips of this invention can be used with all types of wiring boxes, such as octagonal, round and other configurations. In all of these embodiments of the invention, the clips 34 or 52 will be pivotably mounted. This enables the boxes to be mounted on surfaces other than planar surfaces.

It should be noted that in all embodiments of this invention the back wall 12 remains imperforate. Thus, the back wall is sufficiently thick in the area of each of the recesses 32 to enable the securement of the clips 34 or 52 without piercing or in any other way penetrating through the back wall. This is a key feature of the invention since the weatherproof condition of the electrical junction box must be maintained.

The electrical junction box of this invention can be used in any of the industrial, commercial or residential applications used for the prior art electrical junction boxes. The electrical component placed in the cavity of the box can be a receptacle, a switch, a socket or merely a connector for joining wires terminating in the box.

One of the advantages of the clips of this invention is that the electrician who utilizes the box does not have to unscrew and rescrew mounting lugs in place as is necessary with the prior art screw-fastened lugs for mounting an electrical junction box. All that is necessary in utilizing the electrical junction box of this invention is for the electrician to merely pivot one of the mounting clips. In many industrial and commercial uses, a great many electrical junction boxes are used, and accordingly the savings in time and money encountered in using the electrical junction box of this invention is substantial.

Without further elaboration, the foregoing will so fully illustrate my invention, that others may, by applying current or future knowledge, adopt the same for use under various conditions of service.

What is claimed as the invention is:

1. An electrical junction box comprising a back wall, a top wall, a bottom wall and side walls defining an open cavity for reception of an electrical component, a plurality of clips pivotally mounted on said back wall adjacent an edge thereof for securement of said junction box on a supporting surface, said clips being pivotable about an axis which is parallel to the back wall, said clips being pivotable through an arc of approximately 180° from a position parallel to said back wall and inward of said edge to a position parallel to said back wall and outward of said edge, and each of said clips having an opening formed therein for reception of a fastening device.

2. The electrical box of claim 1 wherein all of said walls are unitarily cast.

3. The electrical junction box of claim 1 wherein said back wall has a plurality of non-perforating recesses formed therein with each of said clips being pivotally mounted in one of said recesses.

4. The electrical junction box of claim 3 wherein each of said recesses is dimensioned to receive a clip entirely within the walls thereof whereby said clips lie within the plane of the outer surface of said back wall, with each of said clips being pivotal to a position wherein said opening is outward of the outer edge of said back wall.

5. The electrical junction box of claim 1 wherein said clips are positioned adjacent said top and bottom walls and are pivotable to a position beyond the top and bottom edges of said back wall.

6. The electrical junction box of claim 5 wherein said clips are further positioned adjacent said side walls.

7. The electrical junction box of claim 1 wherein said clips are positioned adjacent said top and bottom walls and are pivotable to a position outward of the side edges of said back wall.

8. An electrical junction box comprising a back wall, a top wall, a bottom wall and side walls defining an open cavity for reception of an electrical component, a plurality of clips pivotally mounted on said back wall adjacent an edge thereof for securement of said junction box on a supporting surface, and each of said clips being formed from a resilient material and comprising a pair of substantially parallel legs having a ring formed therebetween, said ring being adapted to receive a fastening device.

9. An electrical junction box comprising a back wall, a top wall, a bottom wall and side walls defining an open cavity for reception of an electrical component, a plurality of clips pivotally mounted on said back wall adjacent an edge thereof for securement of said junction box on a supporting surface, and each of said clips being formed from a resilient material and comprising a substantially circular portion having a reduced neck at the bottom thereof, said circular portion being adapted to receive a fastening device.

* * * * *